No. 12,836.

REISSUED JULY 28, 1908.

S. ELLIOTT.

STRIP SERVING DEVICE.

APPLICATION FILED JULY 1, 1908.

Witnesses:
Horace H. Crossman
Edwin T. Luce

Inventor:
Sterling Elliott.
by Emery and Booth. Attys

UNITED STATES PATENT OFFICE.

STERLING ELLIOTT, OF NEWTON, MASSACHUSETTS, ASSIGNOR TO NATIONAL BINDING MACHINE COMPANY, OF BOSTON, MASSACHUSETTS, A CORPORATION OF MAINE.

STRIP-SERVING DEVICE.

No. 12,836. Specification of Reissued Letters Patent. Reissued July 28, 1908.

Original No. 856,136, dated June 4, 1907, Serial No. 282,389. Application for reissue filed July 1, 1908. Serial No. 441,267.

*To all whom it may concern:*

Be it known that I, STERLING ELLIOTT, a resident of Newton, in the county of Middlesex and State of Massachusetts, have invented certain new and useful Improvements in Strip-Serving Devices, of which the following is a specification.

This invention relates to devices or apparatus for supplying strips of paper employed for wrapping or binding packages, and has particular reference to that type of apparatus of this character employing a support for a coil of the paper strip which has been previously gummed on one side and then dried, and having means for moistening the gummed side of the strip as the latter is drawn from its coil, and having also means for displacing the free end of the strip after the portion to be used has been severed therefrom. So far as the apparatus shown is concerned, however, an ungummed strip of paper might be employed, in which case the reservoir or tank for containing the liquid to be transferred to the upper side of the strip would contain an adhesive instead of water.

One object of my present invention is to provide an apparatus of the character specified in which the moistening surface will be always above the strip, a space being provided to permit the free end of the strip when not handled, to drop away from the moistener and rest in position to be readily grasped.

To this end the invention consists in the construction and combination of parts substantially as hereinafter described and claimed.

Figure 2:
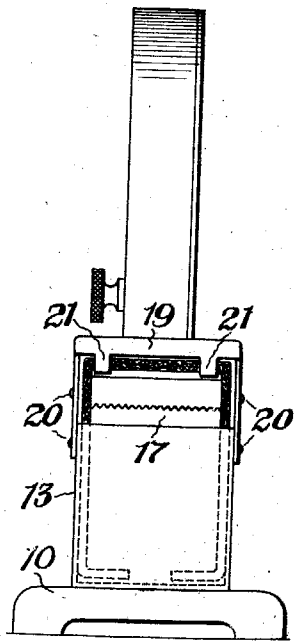
Figure 1:
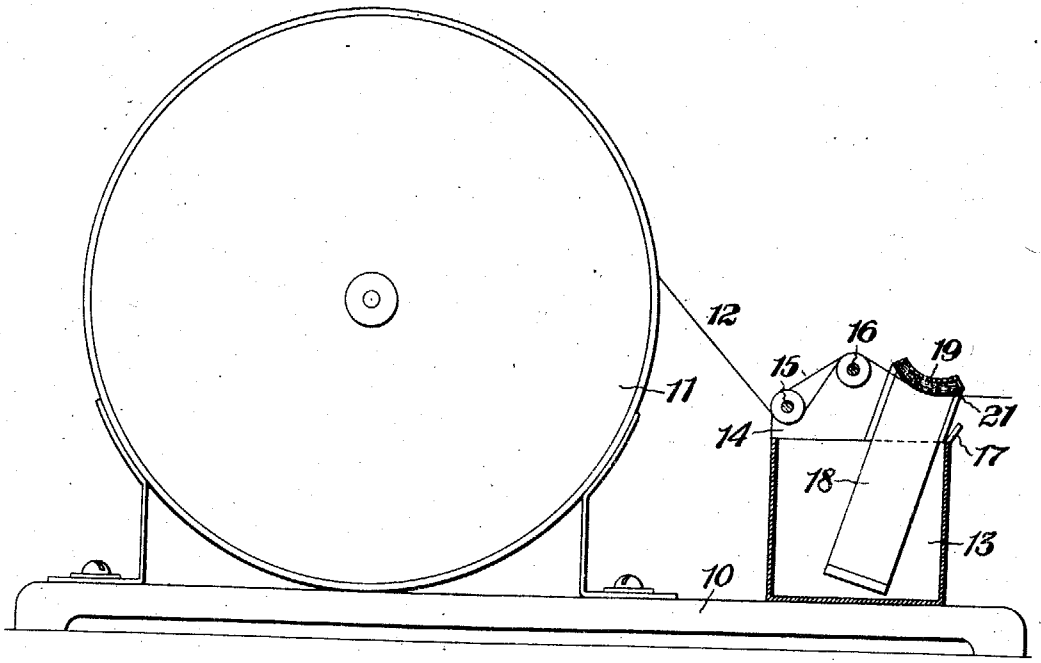

Of the accompanying drawings:—Figure 1 is a side elevation, partly in section, of an apparatus or device embodying this invention. Fig. 2 is an end view from the right of Fig. 1.

Upon a base 10 is suitably supported a casing 11 for the roll or coil of the paper strip 12, or it may be supposed to be a reel for such a strip. A substantially rectangular tank or reservoir 13 is mounted upon said base and has side pieces or extensions 14 in which are mounted two rollers 15 and 16. At the front edge of the tank or reservoir is a cutter 17, and between the roller 16 and cutter 17 is located the moistener 18. Said moistener is shown as having substantially an inverted U shape. Said moistener may be supported by any suitable means in the position substantially as shown, but I prefer to employ a support comprising a bridge-piece 19 having an inverted U shape, the ends of said bridge piece being connected to the sides of the reservoir as by rivets 20. The bridge or support 19 is formed with lugs 21 which are bent over and under the edges of the moistener 18 so as to support the horizontal portion of the moistener and prevent it from dropping upon the strip 12. The moistener 18 may be composed of any suitable material adapted to act by capillary attraction to raise the liquid in the tank 13 and keep the under horizontal portion of said moistener in condition for use. Any suitable moistener may be employed, that herein shown being adapted to the type of my invention here selected for illustration.

In operation the strip 12 is passed under the roller 15 and over the roller 16, then under the moistener supported by the bridge and out through the space between said bridge and cutter 17. When the strip is to be used it will be drawn outward in the direction in which the free end is represented in Fig. 1. When a sufficient length has been obtained the operator will simply carry the strip down against the cutter 17 so as to sever the strip, and the end will remain in a downwardly inclined direction out of contact with the moistener. It will be observed that in this type of the invention I employ guiding means for the strip between the support for the strip and the moistener, and that the strip severing means is located in proximity to the moistener, but is spaced therefrom, the relative location of the moistener and the strip severing means being such that the operative pulls the strip in a given direction to draw it across or in contact with the moistener, and then swings or moves the strip through an arc, the extent of which depends upon the extent of separation and relative location of the moistener and strip severing means, thereby to remove the strip from contact with the moistener and to bring it into operative engagement with the severing means, so that when the strip is being severed, it is out of contact with the moistener. It is apparent that the relative location of the guiding means, the moistener and the severing means may be varied as desired, an important feature of my invention being, in this embodiment thereof, such location of parts that the strip while being severed, may be withdrawn or separated from the moistener. The presence of the roller 15 is not absolutely essential. If present the strip may pass over it and also over the roller 16, or said roller 15 may be placed higher if desired. This would still result in the paper dropping away from the wick or moistener when the free end is released.

Having thus described my invention I claim:—

1. An apparatus of the character specified, comprising a tank or reservoir, a horizontal moistener elevated above the top of the tank and having a space whereby the strip may be led beneath said moistener, and between it and the tank and a support for the strip to serve as a guide against which the strip may be drawn when raised in contact with the moistener.

2. An apparatus of the character described comprising a support or casing 11 for a strip of paper or the like, a reservoir 13 supported in operative relation thereto beneath the service path of the strip, a guide 15 for the strip, a moistener 18 supported above and in operative relation to the reservoir, and strip severing means 17 located in proximity to the moistener, the location of the strip severing means and the construction of the parts being such that the strip is out of contact with the moistener during the severing action.

3. An apparatus of the character specified, comprising a tank or reservoir, and an inverted moistening device having an exposed surface above the liquid in the tank or reservoir, means being provided whereby a strip may be drawn in contact with the under surface of the moistener and whereby said strip, when released, will drop away from said surface.

4. An apparatus of the character specified comprising a tank, a moistener having an end therein, and a portion intermediate its ends exposed to a strip to be moistened, the strip passing during the moistening action between such intermediate portion of the moistener and the tank.

5. An apparatus of the character specified comprising a tank or reservoir, a moistening strip having ends therein, and a portion intermediate the ends exposed for application of a strip to be moistened thereto, the strip passing during the moistening action between such intermediate portion and the tank.

6. An apparatus of the character specified comprising a tank or reservoir, a moistening device operatively connected to the tank and having an exposed strip moistening portion, and a supporting bridge piece for the moistener, the strip when not being drawn upon, being supported out of contact with the moistener, and a severing blade substantially vertically in line with the moistening device.

7. An apparatus of the character specified comprising a tank or reservoir below the service path of the strip, a moistener operatively connected to said tank, means to guide the strip to said moistener, and a strip severing means located in proximity to the moistener, the construction and location of parts being such that during the severing action the strip is out of contact with the moistener.

8. An apparatus of the character specified comprising a tank or reservoir, a moistening strip having one or both ends extending into the tank or reservoir, a strip support at one side of the moistener, and a strip severing means adjacent the other side of the moistener the construction of parts being such that during the severing action the strip is out of contact with the moistener.

9. An apparatus of the character specified comprising a frame, a tank or reservoir mounted thereon beneath the service path of the strip, a moistener operatively connected to the tank, means to guide a strip to the moistener, and a strip severing means supported by the frame, the construction of parts being such that during the severing action the strip is out of contact with the moistener.

10. An apparatus of the character specified comprising a tank or reservoir, a moistener having a moisture receiving portion depending therefrom and in said tank or reservoir and having an exposed strip moistening surface the strip passing in operation between the moistener and the tank.

11. An apparatus of the character specified comprising a tank or reservoir, a moistener having a moisture receiving portion depending therefrom and in said tank or reservoir and having an exposed strip moistening surface, and a severing means upon the tank, the strip passing in operation between the moistener and the tank.

12. An apparatus of the character specified comprising a tank or reservoir, a moistener having a moisture receiving portion depending therefrom and in said tank or reservoir and having an exposed strip moistening surface, and a severing means in close proximity to the moistener the strip passing in operation between the moistener and the tank.

13. An apparatus of the character described comprising a tank or reservoir and a moistening device having an exposed surface above the liquid in the tank or reservoir, means being provided whereby a strip may be drawn in contact with the under surface of the moistener and whereby the moistener and strip may be separated after the moistening of the strip.

14. An apparatus of the character specified comprising a tank or reservoir beneath the service path of the strip, a moistener operatively connected to the tank, a guide adjacent the moistener, the strip being drawn downwardly off the roll and thence under the guide to the moistener, and a strip severing means located in proximity to the moistener, the location of the strip severing means and construction of the parts being such that the strip is out of contact with the moistener during the severing action.

15. An apparatus of the character specified comprising a tank or reservoir beneath the service path of the strip, a moistener having one or both ends depending into the tank or reservoir, a strip support at one side of the moistener, and a strip severing means adjacent the other side of the moistener, the construction and relation of parts being such that the strip is out of contact with the moistener during the severing action.

16. An apparatus of the character specified comprising a support for a strip of paper or the like, a tank or reservoir in operative relation thereto, a moistener operatively connected to the tank, guiding means for the strip between the support therefor and the moistener, and a strip severing means located in proximity to the moistener but spaced therefrom substantially vertically in line therewith, the relative location of the moistener and the strip severing means being such that the operative pulls the strip in one direction to draw it across the moistener and then swings it in an arc to remove it from the moistener and to bring it into operative engagement with the severing means while removed from the moistener.

17. An apparatus of the character specified comprising strip supporting means, a tank or reservoir in operative relation thereto, a strip moistener operatively connected to the tank, guiding means for the strip between the strip supporting means and the tank, strip severing means carried by the tank and in proximity to the moistener but spaced therefrom, the relative location of the moistener and the strip severing means being such that the operative pulls the strip in one direction to draw it across the moistener and then swings it in an arc to remove it from the moistener and to bring it into operative engagement with the severing means while removed from the moistener.

18. An apparatus of the character specified comprising strip supporting means, a tank or reservoir adjacent thereto; a moistener operatively connected to the tank, guiding means for the strip between the supporting means and the moistener, strip severing means formed upon an edge of the tank or reservoir and spaced from the moistener, the relative location of the moistener and the strip severing means being such that the operative pulls the strip in one direction to draw it across the moistener and then swings it in an arc to remove it from the moistener and to bring it into operative engagement with the severing means while removed from the moistener.

19. An apparatus of the character specified comprising strip supporting means, a tank or reservoir mounted in proximity thereto, a moistener operatively related to said tank or reservoir, strip guiding means between the strip supporting means and the moistener, a back or bridge piece supporting the moistener with a portion thereof exposed, and a strip severing means mounted upon a wall of the tank or reservoir and spaced from the moistening means, the relative location of the moistener and the strip severing means being such that the operative pulls the strip in one direction to draw it across the moistener and then swings it in an arc to remove it from the moistener and to bring it into operative engagement with the severing means while removed from the moistener.

In testimony that I claim the foregoing as my invention, I have signed my name in the presence of two witnesses this twenty-ninth day of June A. D. 1908.

STERLING ELLIOTT.

Witnesses:

FRANK J. HOWELL,
EVERETT S. EMERY.